2,947,738
ETHYLENE POLYMERIZATION

Norman L. Hardwicke, Texas City, Tex., assignor to Monsanto Chemical Company, St. Louis, Mo., a corporation of Delaware No Drawing. Filed Feb. 24, 1959, Ser. No. 794,822

2 Claims. (Cl. 260—94.9)

This invention relates to a process for the polymerization of ethylene. More particularly, it relates to a novel initiator for the polymerization of ethylene.

It is well known that ethylene can be polymerized at high pressures in the presence of materials which serve as initiators for the reaction. Many of the better known initiators, however, are unstable chemical compounds which are hazardous to store, hazardous to handle, and hazardous to use. The present invention provides a new initiator which does not suffer from these disadvantages. According to the invention, ethylene is polymerized at elevated temperatures and pressures in the presence of perchloryl fluoride as the initiator of the polymerization. Perchloryl fluoride which has the formula $ClO_3F$, is a gas under normal temperature and pressure conditions and is easily handled in the polymerization process with no significant hazard. It is thermally stable at ordinary storage temperatures and at temperatures up to 500° C.; it is stable to mechanical shock; it is nonflammable, only moderately toxic, and its odor is detectable (2 to 10 p.p.m.) at well below toxic levels.

The following examples are given to illustrate the invention and are not to be construed as limiting its scope in any manner.

*Example 1*

After careful purging of the steel bomb used as the polymerization reactor together with all lines connected thereto to eliminate all traces of air or oxygen, about 2.60 millimoles of perchloryl fluoride was charged to the bomb. Monomeric ethylene containing substantially no oxygen was then charged to the bomb. Mixing of the compounds was effected by the jet action of the entering ethylene. The amount of perchloryl fluoride in the mixture represented about 0.4% by weight of the ethylene. The bomb was heated to a temperature of about 178° C. under a pressure of about 12,650 p.s.i.g. for about 45 minutes. At the end of this time the pressure was released and the reaction product removed. Approximately 3.5 g. of a soft white polyethylene was obtained.

*Example 2*

Following the procedure of Example 1, ethylene was polymerized in the presence of approximately 1% by weight of perchloryl fluoride at 191° C. and 10,000 p.s.i.g. for a period of about 56 minutes to obtain 6.7 g. of a white waxy polyethylene.

*Example 3*

Ethylene was again polymerized in the same reactor and using the same method of Example 1 at a temperature of about 170° C., a pressure of 25,000 p.s.i.g., and in the presence of about 0.02% by weight of perchloryl fluoride. About 6 grams of tough white solid polyethylene was recovered.

Reaction conditions other than those exemplified can be used without departing from the scope of the invention. Temperatures may vary from 100° C. to about 400° C. with those in the range from about 150° C. to about 250° C. being preferred. Pressure may likewise vary over a wide range from 2500 p.s.i.g. to 50,000 p.s.i.g. and above depending upon the particular type of polymer desired. The amount of initiator used depends to some extent on the type of polymer desired, which in turn depends upon the particular conditions of temperature and pressure used. Generally, amounts of initiator from about 0.001% to about 5.0% by weight of the ethylene to be polymerized are employed.

The polymerization of ethylene using perchloryl fluoride can be carried out either as a batch, semi-continuous, or continuous operation.

Not only homopolymers may be prepared using the perchloryl fluoride as initiator. Ethylene may be copolymerized as well with other polymerizable compounds using this initiator. Suitable comonomers include, for example, vinyl halides such as vinyl fluoride, vinyl chloride, etc.; vinyl hydrocarbons, both aliphatic and aromatic, such as propylene, isobutylene, and other olefins, butadiene, isoprene, piperylene, dimethylbutadiene, styrene, alpha-alkyl styrenes, ring-substituted alkyl styrenes and the like; the halogen derivatives of hydrocarbons such as chlorostyrenes, fluorostyrenes, chloroprene, bromoprene; vinylidene compounds such as vinylidene chloride, vinylidene fluoride 1,1-chlorofluoroethylene; vinyl esters including vinyl acetate, vinyl butyrate, vinyl stearate, etc.; vinyl ethers including vinyl methyl ether, vinyl ethyl ether, vinyl octyl ether, and the like; acrylic acid, acrylonitrile, acrylic esters including methyl, ethyl, propyl, etc., acrylates, acrylamide, α-substituted acrylic acids, nitriles, esters, and amides such as methacrylic acid, methacrylonitrile, ethyl methacrylate, methylacrylamide, methyl methacrylate, atroponitrile, etc.; the acids, esters, and amides of α,β-ethylenically unsaturated dicarboxylic acids such as fumaric, maleic, citraconic, itaconic, etc., acids or anhydrides, their esters and amides and the like. If a copolymer is prepared by the process of this invention, it should contain more than 50% by weight of ethylene.

What is claimed is:

1. The process of polymerizing ethylene which comprises heating ethylene at a temperature within the range from about 100° C. to about 400° C. and a pressure in the range from about 2500 to about 50,000 p.s.i.g. in the presence of perchloryl fluoride, the amount of perchloryl fluoride present being in the range from about 0.001% to about 5.0% by weight of the ethylene to be polymerized.

2. The process of polymerizing ethylene which comprises heating ethylene at a temperature between 150° C. and 250° C. and a pressure between 10,000 and 25,000 p.s.i.g. in the presence of perchloryl fluoride in an amount in the range from about 0.001% to about 5.0% by weight of said ethylene.

References Cited in the file of this patent

Mellor: "Comprehensive Treatise on Inorganic and Theo. Chem.," Supp. II, part 1; pub. by Longmans, Green & Company (1956), New York; page 183.